Nov. 3, 1970
J. J. KOSMO ET AL
3,537,668
EXTRAVEHICULAR TUNNEL SUIT SYSTEM
Filed Sept. 12, 1969
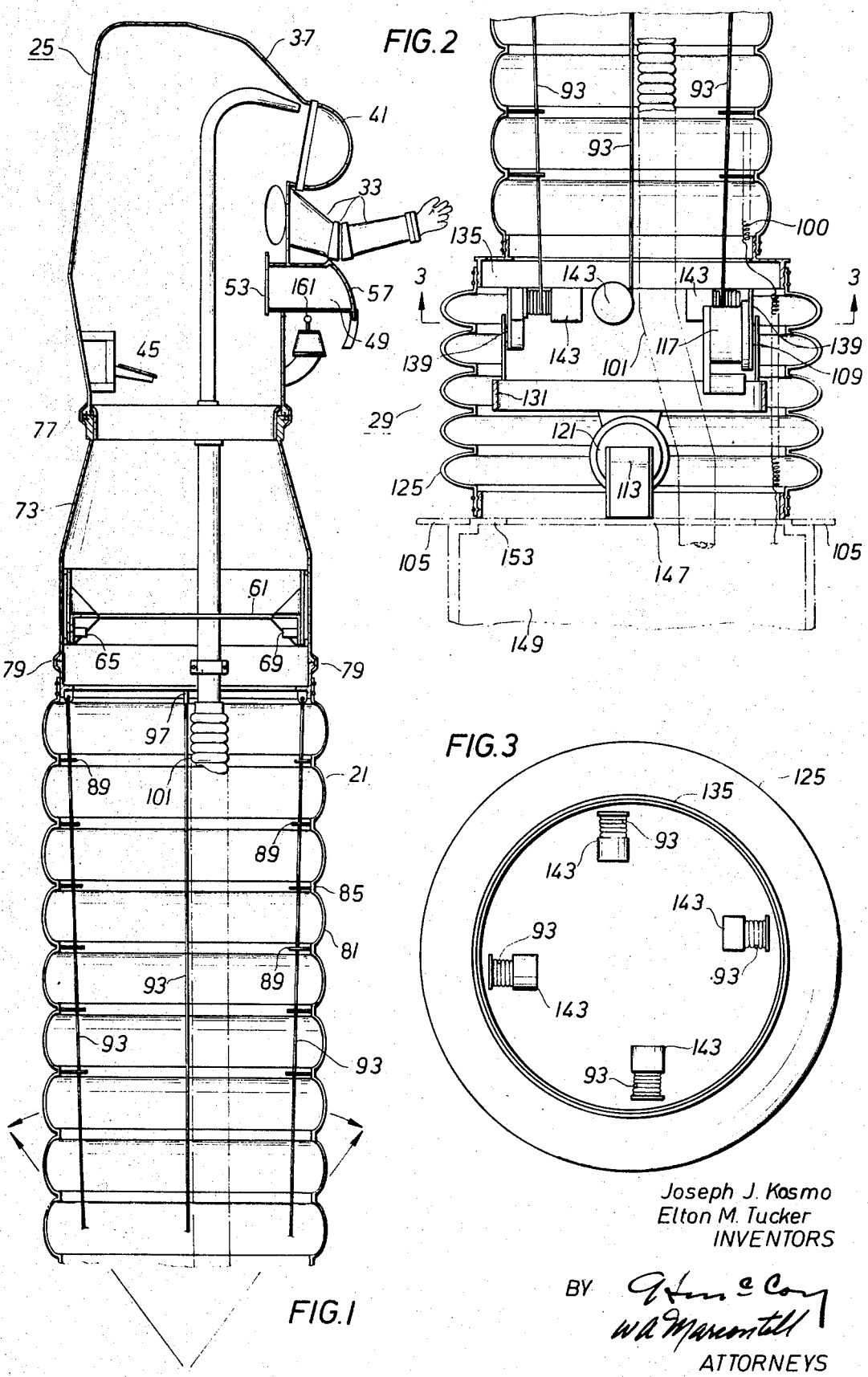
Joseph J. Kosmo
Elton M. Tucker
INVENTORS
BY
ATTORNEYS

United States Patent Office 3,537,668
Patented Nov. 3, 1970

3,537,668
EXTRAVEHICULAR TUNNEL SUIT SYSTEM
Joseph J. Kosmo, Houston, and Elton M. Tucker, La Porte, Tex., assignors to the United States of America as represented by the Administrator of the National Aeronautics and Space Administration
Filed Sept. 12, 1969, Ser. No. 857,445
Int. Cl. B64g 1/00
U.S. Cl. 244—1
9 Claims

ABSTRACT OF THE DISCLOSURE

An extravehicular human work station permitting manual operation in a hostile environment. The work station consists of a semi-anthropomorphic assembly attached to the distal end of a tunnel extending from a vehicle wall. The tunnel is of convoluted bellows construction and may be selectively axially expanded or contracted by a system of individually controlled cables. The cables may be operated individually also in order to regulate the angle from which the tunnel axis projects from the vehicle wall.

---

The invention described herein was made by employees of the United States Government and may be manufactured and used by or for the Government for governmental purposes without the payment of any royalties thereon or therefor.

BACKGROUND OF THE INVENTION

The present invention pertains to pressure suits for enabling human activity in a hostile environment. More specifically it pertains to an expansible tunnel which may be deployed in cantilever manner from a vehicle operating in the hostile environment and which carries at the distal end thereof a semi-anthropomorphic assembly for use by an operator.

For exemplary and descriptive purposes the present invention is related hereafter in conjunctive use with a space vehicle and the functions of a space vehicle in the exploration of space and planetary bodies. It should at the outset however be recognized that the principles disclosed herein and the exemplary structures relating thereto are equally adapted for use in other environments such as operations under water and/or activities in hostile atmospheres.

The successful accomplishment of space exploration missions in the future will require astronauts to perform a wide variety of extravehicular activities, such as inspection, repair, maintenance, and data retrieval. According to the present state of the art, such extravehicular operations require the crew member to prepare himself in an extravehicular protective space suit which utilizes either a portable life support system in the form of a back pack or an umbilical line which carries communications and ventilation gas from the parent vehicle. Further, present systems require that the crewmen depressurize the entire spacecraft in order to permit departure of an astronaut to the surrounding environment. The depressurization process exposes all crewmen to the hazards of the hard vacuum environment and forces the crew inside the spacecraft to perform their control functions with pressurized space suits. In addition to presenting substantial crew safety risks this procedure involves a significant loss of oxygen. Such loss of oxygen is obviously compounded during missions requiring multiple extravehicular activities.

SUMMARY OF THE INVENTION

The present invention obviates all of the aforementioned hazards and disadvantages by providing for a pre-constructed space suit which is integrally connected to an expansible tunnel that is deployed from the space vehicle, the tunnel itself being connected to the vehicle wall in such a manner as to produce an integral, unitary pressurized enclosure. The pressure suit attached to the distal end of the tunnel consists of a semi-anthropomorphic suit having a torso equipped with shoulder, elbow, and wrist joints which enable the crew member to perform regular upper body functions after he has moved from the vehicle through the tunnel and thereafter into the torso. A pressure helmet with visors thereon also characterizes the torso assembly. Further a pass-through air lock, located in the mid region of the torso enables the crew member to bring in or pass out extravehicular tools, data packages, or part replacements.

The torso and tunnel which comprise the tunnel suit system are also equipped with a controllable mobility drive system with which the crew member can reposition himself in relation to the object upon which he is working. The mobility drive system is capable of maneuvering the tunnel suit system within a sixty degree cone, as well as translational movement along the longitudinal axis of the tunnel for a distance of approximately three feet. When not in use the system is stowed in a retracted condition aboard the vehicle. Deployment is accomplished internally from the vehicle by the application of pressure to the tunnel. It is thus seen that all of the disadvantages and hazards attendant to prior art systems are obviated by the present invention. For example, the present invention provides a system in which the crew member is not wholly exposed to the extravehicular environment. In case of emergency, he can crawl back through the tunnel and an air lock at the end thereof and into the vehicle.

Another advantage of the present invention is a structure which minimizes the risk of exposure to the hostile environment by remaining crew members on board during extravehicular operations since the vehicle need not be depressurized.

Another advantage and feature of the present invention is that there is substantially no loss of cabin oxygen during extravehicular operations, even over extended operational periods. The tunnel can remain deployed while crew members change positions without having to go through a cabin repressurization cycle.

Still another feature and advantage of the invention is that extravehicular missions can be performed as frequently as desired without severe loss of breathing oxygen.

Another feature of the invention is the provision for an extendable operating structure which can be maneuvered in substantially any direction by the crewman therein.

Still yet another feature of the invention is the provision for a tunnel suit system which is easily stowed, deployed, and retracted from a base vehicle.

These and numerous other features and advantages of the invention will become more readily apparent upon a reading of the following detailed description, claims, and drawing wherein like numerals denote like parts in the several views and in which:

BRIEF DESCRIPTION OF THE DRAWINGS

FIG. 1 illustrates a side view in longitudinal cross section of the extensible tunnel at its outer end and the work station integrally attached thereto.

FIG. 2 illustrates a side view in longitudinal cross section of a portion of the extensible tunnel and the mobility drive system which operates the position of the tunnel.

FIG. 3 is a sectional view along the plane 3—3 of FIG. 2.

DETAILED DESCRIPTION

The tunnel suit system of the invention consists essentially of three primary components, namely, the tunnel structure 21 itself, the activity station 25, and the mobility drive system 29. The activity station 25 is the area where the astronaut actually performs operations on extravehicular work sites. The station consists of a pair of anthropomorphic arm, shoulder, elbow, and wrist joints 33 disposed at an appropriate distance from one another and movably attached to a semi-anthropomorphic mobility torso 37. The torso 37 may be generally constructed from high tensile aluminum, or other appropriate material which is fabricated to the desired shape and chemically etched to the appropriate thickness in order to reduce its weight. Structural rigidity and meteoroid protection may be imparted to the torso by a sandwich-type layer of epoxy honeycomb and Fiberglas or the like. Appropriate multi-layer insulation (not shown) may be provided as necessary depending upon the environment in which the entire system is to be used. The torso 37 is further characterized by a transparent pressure helmet 41 through which the astronaut may visually observe movement of the arm, shoulder, elbow, and wrist assembly 33. Interiorly of the torso 37 there is provided an adjustable tractor seat 45 whose height may be varied so as to facilitate comfortable positioning of the astronaut with respect to the helmet 41 and anthropomorphic assembly 33. As evident from FIG. 1, the mobility torso 37 is substantially larger than the occupant who operates therewithin. This enables the astronaut to move about relatively unhindered and to stand erect on the center line of the tunnel when necessary in order to withdraw his arms from the arm assemblies 33 upon completion of his work. Conversely, his ability to move forward and rearward within the torso 37 enables the astronaut to easily place his arms within the assemblies 33 and thereafter lean forward to bring his head into the helmet area while at the same time slipping his fingers into the glove sections. It will readily be recognized that the mobility torso 37 may take other configurations than that shown in the preferred embodiment of FIG. 1 and that it may therefore, for example consist simply of a conventional hard suit assembly rather than the cabin like structure shown. The torso is still further characterized by a pass-through air lock 49 which includes an inner door 53 and an outer door 57 which may be slideably moved out of position so that tools or other objects can be placed in the air lock. Removal of the tools from the air lock to within the torso is accomplished by the astronaut who simply withdraws his arms from the assemblies 33 in order to open inner door 53 and remove the object. The outer door 57 is of course closed prior to this time. Movement of an object in the opposite direction is of course accomplished in the reverse manner, that is, opening first of the inner door 53, placing of the object in the air lock 49, closing of the inner door, and subsequently opening of the outer door 57 for removal.

For support, the astronaut stands on an adjustable-height foot platform 61. The platform can be adjustably moved by means of locking handles 65, 69 which when unlocked manually by the astronaut permit the easy adjustment of platform 61 relative to the pressure helmet 41 and arm assemblies 33. Thus the adjustable platform 61 and adjustable tractor seat 45 provide for comfortable positioning of the astronaut within the torso 37. The platform 61 is adjustably connected to the adaptor section 73 which connects the torso 37 to the extensible tunnel structure 21 described hereinafter. The torso 37 is movably affixed to the adaptor section 73 by means of a sealed rotary bearing 77 which permits rotational movement of the torso with respect to the adaptor section 73 without the loss of internal pressure. Such rotary bearings utilize a double row of bearings having angular contact with one another and are generally known in the art. Seal of the bearing is achieved with a Teflon ring which relies upon internal pressure of the system to seat the seal. As a consequence of the sealed rotary bearing 77, the astronaut may easily position the arm assemblies 33 at any radial position within a 360° circle by merely imparting a slight torque to his upper body while standing on platform 61 and thereby manually move arm assemblies 33 to the desired position.

The adaptor section 73 is fixedly connected to the extensible tunnel structure 21 at the distal end of the latter (see FIG. 1) by appropriate clamp means 79. The tunnel structure may be of any appropriate length which is technically feasible, and may be about 30 inches in diameter in order to permit easy translational movement of a human therethrough. The tunnel is constructed in a series of convolutes 81 in order to provide a method of stowability, as well as to prevent bulging upon deployment and pressurization. The convolutes 81 are reinforced by appropriate straps 85 which are disposed in circumferential relationship on the tunnel and between the convolutes. The tunnel may be made of any appropriate material depending upon the intended environmental characteristics in which it is to operate. For use in outer space, for example, the materials of the tunnel may be generally described as a plurality of layers in laminate form in which the outer protective layer may be a white, plain weave nylon. Subsequent internal alternate layers may consist of a polyimide film laid upon fibrous glass yarns. A subsequent internal layer of rubber coated nylon and fibrous glass cloth is followed by an interior layer of Teflon coated fibrous glass cloth. Each of the layers serves a specific function such as for example flame resistance, pressure integrity, high tensile strength, and thermal and micro meteoroid protection. Equally disposed about the circumference of the tunnel and in the root section of each convolute is an eye guide for receiving the deployment cables 93 therethrough. The deployment cables are fixedly tied to the adaptor section 73 by eyelet hooks 97 thereon. Disposed within the tunnel structure 21 and anchored at each convolute root is a collapsible duct 101 which brings in conditioned air to the activity station 25. A flexible communications and power control cable also extends from the activity station 25 to the spacecraft or other vehicle.

Reference is now made to FIG. 2 wherein there is shown the lower portion of the extensible tunnel structure 21, the mobility drive system 29 and the structural connection and inter-operation of these components with respect to the spacecraft or vehicle wall 105. The mobility drive system 29 includes a deflection mechanism consisting of a two axis gimbal joint comprising upper and lower axes 109 and 113, respectively. Each of the gimbal joints is driven by a high torque deflection drive motor 117 and 121, respectively. Conjunctive operation of the motors produces a universal type joint action between the two axes. High torque motors are necessary because of the high moments which the tunnel can theoretically experience during spacecraft maneuvering. Therefore, a prime consideration in the design of the deflection drive motor is that it should accurately position the tunnel without coasting, backlash, or significant dead-band control.

The gimbal joint 109, 113 of the system uses a constant-volume bellows 125. The gimbal is capable of tilting the bellows at an angle of ±30° about each axis, respectively. Since the gimbal axes are mutually perpendicular, it is readily seen that positioning of the tunnel at angles other than the two axes is accomplished by simultaneous tilting of both gimbals.

Fixedly supported on the lower gimbal joint 113 is the lower gimbal ring 131. The lower gimbal ring is structurally attached to upper gimbal ring 135 by the pivoted arm means 139. The pivoted arm means are operatively connected to upper gimbal joint 109 which is driven by the aforementioned motor 117. Attached to the upper gimbal ring 135 are four synchronized motor driven winches which are used to elongate and shorten the tunnel when required. The deployment cables 93, affixed at their distal ends to eyelet hooks 97, engage and wind around each of the four respective winches 143. As best shown in FIG. 3, the deployment cables 93 and winches 143 are arranged in 90° intervals about the circumference of the upper gimbal ring 135. Attachment of the bellows 125 to vehicle wall 105 is accomplished by appropriate structural connection. When in its stowed condition prior to deployment, the tunnel occupies about one-third of its deployed volume. Upon inflating the tunnel structure expands axially to its fully deployed length, this optimally considered to be about twenty feet. When inflated at 5 p.s.i., the tunnel structure becomes rigid and capable of supporting an astronaut in the activity station during normal orbiting maneuvers. Deployment, operation from, and stowage of the tunnel-suit system is performed as follows.

The tunnel suit system must be packaged to survive the launch environment. One method of doing this is to place the system within an air lock 149 within the vehicle. In deploying the tunnel suit system from the stowed condition within the air lock, a protective shroud (not shown) is removed and air from within the spacecraft is allowed to enter the air lock. A movable bulkhead 153 to which the system is anchored is pushed along by the expanding air in the air lock until the bulkhead 153 seats itself against the head end of the air lock which may consist essentially of the vehicle wall 105 and appropriate elastomeric seals in the seating area. By allowing air to enter the tunnel suit system from the air lock, the tunnel is inflated. The winches that hold the tunnel structure in the retracted position allow the tunnel to expand at a controlled rate as air enters the system. Once the system is fully deployed, the astronaut can enter the air lock, and, with a minimum of preparation enter the tunnel 21 and proceed to the activity station 25. Prior thereto, however, the astronaut will prepare, while in the air lock, those tools and equipment required for the extravehicular mission he is to accomplish. He will then carry this equipment with him as he proceeds to the end of the tunnel. Mobility within the tunnel will be accomplished by a hand-over-hand motion. When he reaches the activity station he positions himself in it, adjusts the footrest platform and the seat according to his particular height. He will then open the inside door of the pass-through lock and arrange the tools and other objects required within the pass-through lock. By closing the door and latching it with the handle, the pass-through lock may be automatically vented to space. He then inserts his arms into the arm assemblies 33 and grasps the control stick 161 which is operatively connected via the electrical conduit 100 to the appropriate motors and winches. Flexing of the tunnel is accomplished by pushing the control stick in the direction he wants to go. Axial elongation or contraction of the tunnel is achieved by pulling out or pushing in on the handle of the stick. Rotary positioning of the activity station is achieved by the astronaut manually rotating the whole activity station to the desired orientation by imparting torque to the upper half while standing on foot platform 61. The tools and other equipment are removable from the pass-through lock after it is opened by sliding the external door downward. When his operations are completed, the astronaut simply removes his arms from the arm assemblies 33 and translates back through the tunnel into the vehicle, whereupon stowage of the tunnel suit system may be accomplished by actuation of the winches 143 from within the vehicle.

The drawings and foregoing specification constitute a description of the tunnel suit system of the invention for performing operations in a hostile or foreign environment without actual exposure thereto and without producing the risks to the crew which are normally attendant to such operations. The specification is conveyed in such clear, concise and exact terms as to enable any person skilled in the art to practice the invention, the scope of which is indicated by the appended claims.

That which is claimed is:

1. A life support system for enclosing an operator so that work functions can be performed in a hostile environment without actual physical exposure thereto comprising;

an elongate extensible-retractable tunnel means adapted to be fluid tightly affixed in cantilever manner around an aperture through a structural partition separating a hostile environment from a safe environment;

said tunnel means having at its distal end an activity station means adapted to receive a human occupant therein for carrying out work functions external to the activity station means;

said aperture and tunnel means being of sufficient size to permit a human occupant to traverse therethrough from the safe environment to the activity station means;

said activity station means being affixed to said tunnel means by fluid sealed bearing means whereby said activity station means may be rotatably moved about and axis substantially parallel with the axis of said tunnel means at the distal end thereof; and control means in said activity station means for selectively varying the length of said elongate extensible-retractable tunnel means and also for moving the tunnel means to discrete angular positions with respect to the partition from which it extends so as to thereby provide for movement of said activity station means.

2. The life support system of claim 1 wherein said activity station means comprises a semi-anthropomorphic mobility torso means including an arm assembly so that the operation can position himself therein to accomplish manual operations on objects external to the station means.

3. The life support system of claim 2 wherein said semi-anthropomorphic mobility torso means further includes a pass-through lock convenient to the arm assembly so that the operator can move tools and other objects in either direction between the hostile environment and the interior of the activity station without reduction of pressure or risk of exposure.

4. The system of claim 1 wherein said elongate extensible-retractable tunnel means comprises a plurality of selectively disposed reinforcing means affixed thereto and normally disposed with respect to the longitudinal axis of the tunnel, each said reinforcing means producing a convolute effect on the exterior surface of the tunnel and thereby preventing bulging of any tunnel area when pressure is applied interiorly during deployment and also enhancing the orderly folding of the tunnel when it is retracted.

5. A lift support system for enclosing an operator so that work functions can be performed in a hostile environment without actual physical exposure thereto comprising;

an elongate extensible-retractable tunnel means adapted to be fluid tightly affixed in cantilever manner around an aperture through a structural partition separating a hostile environment from a safe environment;

said tunnel means having at its distal end an activity station means adapted to receive a human occupant therein for carrying out work functions external to the activity station means;

said aperture and tunnel means being of sufficient size to permit a human occupant to traverse therethrough from the safe environment to the activity station means;

activity station position control means comprising a plurality of extensible-retractable means operatively distributed about the periphery of said tunnel means for selectively varying the length and angular position thereof relative to said partition;

said position control means also comprising gimbal means operatively connecting said tunnel means and said partition means; and drive means operatively connected to said gimbal means for selectively moving said tunnel means angularly with respect to said partition means.

6. The system of claim 5 wherein said gimbal means comprises first and second gimbal rings disposed in axially normal relation to one another, each ring being capable of selective angular movement in response to a signal, said drive means including a pair of reversible drive motors, each respectively connected to a gimble ring axis, said control means in the activity station being operatively connected to said reversible drive motors for actuating them individually or jointly upon dispatch of a signal thereto.

7. The system of claim 6 wherein said control means for moving the tunnel axially includes a plurality of winches operatively disposed adjacent the supported end of said cantilever tunnel and, a plurality of cable means having one end thereof affixed to the distal end of the tunnel and the opposite end connected to respective winch means so that actuation of said winch means draws the distal end of the tunnel toward the supported end.

8. The system of claim 7 wherein said elongate extensible-retractable tunnel means comprises a plurality of selectively disposed reinforcing means affixed thereto and normally disposed with respect to the longitudinal axis of the tunnel, each said reinforcing means producing a convolute effect on the exterior surface of the tunnel and thereby preventing bulging of any tunnel area when pressure is applied interiorly during deployment and also enhancing the orderly folding of the tunnel when it is retracted.

9. A life support system for enclosing an operator so that work functions can be performed in a hostile environment without actual physical exposure thereto comprising:

structural partition means between a safe environmental region and a hostile environmental region, said safe region being charged with greater fluid pressure than said hostile region;

extensible-retractable tunnel means having a fixed end and a distal end, said fixed end secured to said partition means whereby said tunnel means interior is in fluid communication with said safe region;

closed observation chamber means rotatably secured by fluid sealed bearing means to said distal end and adapted for human occupancy and entry from said tunnel means;

said tunnel means being of sufficient size to permit human passage through the interior thereof;

extension-retraction control means to selectively vary the projected distance of said distal end from said partition means; and angle control means to selectively vary the angle at which said tunnel means projects from said partition means.

References Cited

UNITED STATES PATENTS 1,866,438  7/1932  Williamson _____ 61—69

FOREIGN PATENTS 1,461,529  11/1966  France.

OTHER REFERENCES

Survey of Remote Handling in Space; Behavioral Sciences Laboratory, 6570th Aerospace Medical Research Laboratories, Aerospace Medical Division; Technical Documentary Report No. AMRL–TDR–62–100; September 1962; pp. 15–17, 33, 42.

MILTON BUCHLER, Primary Examiner

J. L. FORMAN, Assistant Examiner

U.S. Cl. X.R.

2—2.1; 61—69; 114—16.6